BOWEN, REED & WHELAN.
Harvester Rake.
No. 81,130.          Patented Aug. 18, 1868.
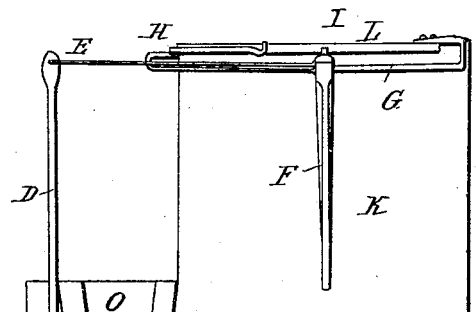
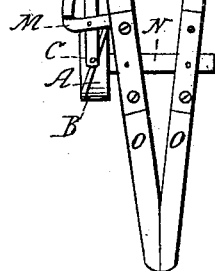
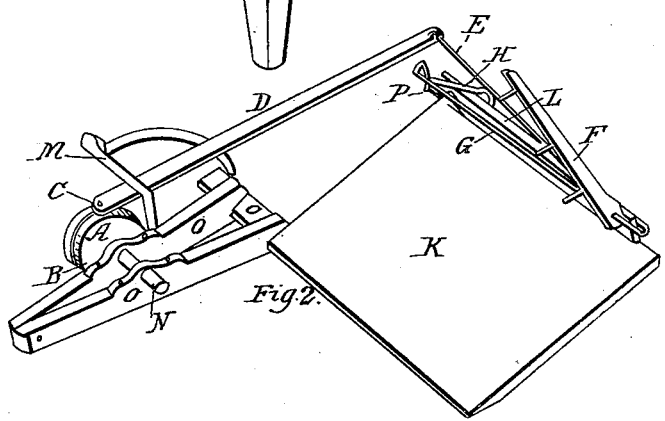
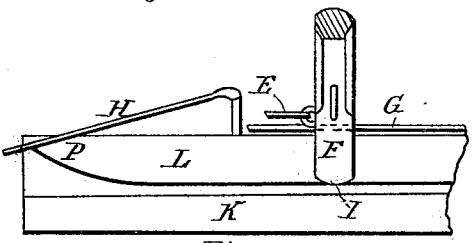

UNITED STATES PATENT OFFICE.

JAMES B. BOWEN, CLEANTHUS A. REED, AND CHARLES A. WHELAN, OF MADISON, WISCONSIN.

IMPROVEMENT IN HARVESTER-RAKES.

Specification forming part of Letters Patent No. 81,130, dated August 18, 1868.

*To all whom it may concern:*

Be it known that we, JAMES B. BOWEN, CLEANTHUS A. REED, and CHARLES A. WHELAN, of Madison, Dane county, Wisconsin, have invented a new and useful Machine for Raking Grain as the same is cut by a reaper; and we do hereby declare that the following is a full, clear, and exact description of the construction and operation of the same, reference being had to the annexed drawings, making a part of this specification, in which—

Figure 1 is a plan. Fig. 2 is a perspective view; Fig. 3, a profile of a section, showing the rake and spring; and Fig. 4, a section showing a front view of the rake and its attaching-rod, and the spring which lifts the same.

A is a wheel attached to the shaft of the drive-wheel of the reaper. B is an eccentric-slot cut in the wheel A around its periphery. C is a pin or dog working in the slot B. D is a lever, to which the dog C is attached. E is a rod connecting the lever D with the head of the rake. F is the rake. G is the rod running through the head of the rake F, and on which it moves backward and forward and rises and falls. H is a spring for throwing down the head of the rake at the point where the bundle is discharged. I is a pin inserted in the head of the rake, for raising it up after the bundle is discharged. K is the platform. L is an attachment to the platform, at its rear edge, elevated above the same, and to which are attached the rod G and the spring H. M is a standard, having a circular arm, which forms a rest or support for the lever D. N is the shaft of the drive-wheel, to which is attached the wheel A. O is the frame for the drive-wheel. P is a slot, cut in the right-hand end of the attachment L, in the form of a curve, to receive the pin when thrown down by the spring H, and complete the raising of the rake.

The construction and operation of our machine are as follows: We construct our platform in any of the approved forms, and of the usual materials; also our rake. We bore a hole through the rear end of the rake, near and a little below the center, through which we run the rod G. We then bend the left-hand or outward end of said rod, by two square turns, to the back of the attachment L, where it is fastened. The right-hand or inward end of said rod may be bent in the same way, or it may be carried forward and then bent, and carried backward, to be more out of the way of the grain when discharged from the platform.

We insert in the right-hand or inward side of the rake-head an eye, into which we place the left-hand or outward end of the rod E, and bend the latter also into the form of an eye or hook, the other end of the rod E being hooked into a hole made in the backward end of the lever D, both the attachments of said rod E being loosely made, so as to admit of easy motion.

We place in the extreme backward end of the rake the pin I, projecting to the rear.

We construct the steel spring H with its left-hand or outward end bent first backward and then downward, and fastened to the rear of the attachment L in such a manner that its right-hand or inward end shall touch and rest upon the inward end of the attachment L, upon its upper edge.

We construct the slot P, passing downward in the inside of the attachment L, from the point where the spring H touches the same to near the upper surface of the platform.

We provide the lever D of sufficient length to reach near to and over the right-hand end of the attachment L from the wheel A.

In the end next to said wheel we insert, in the lower side of the lever D, the dog or pin, the head of which is shown at C projecting downward, and having its sides rounded into an oblong form, but eccentrically, so as not to catch or bind in the turning parts of the slot B.

We attach to the frame of the reaper the standard M, fastened to the same near the backward surface of the wheel A, which reaches upward perpendicularly a little above said wheel, and is there bent squarely to the right to a point outside of said wheel, and is then bent backward and downward, and curved to the left, forming an arm for the support of the lever over its whole sweep when in motion. This standard is pierced on its horizontal part, over and back of the wheel A, for the attachment of the lever D by a journal or pivot, which lever passes under said standard at this point, but over the arm of the standard at its circular part, upon which it there rests and plays in motion. The attachment having these connections may be fastened on to the platform at its rear edge.

We then construct a wheel of suitable diameter and width of rim to produce the motion necessary, and as hereinafter described, and fasten the same upon the axle of the drive-wheel, which is lengthened to admit and receive the same. In the rim of this wheel (shown at A″) we sink the slot B, commencing at the outside or right-hand side of the rim of the said wheel A, and running diagonally and rapidly, or at an obtuse angle, toward the inside or left-hand edge of the rim, until near such edge; then turn back toward the right again at a much less angle, so as to reach the point of beginning, the first direction described of said slot being about one-fourth the way around said wheel A, and the second direction described being three-fourths the way around; or these proportions may be altered or regulated to suit the necessities of the motion of the rake, hereinafter mentioned.

The wheel A may be thrown in and out of gear in the usual way.

The head of the rake F may be provided with a metal box where the rod G passes through the same.

The pin I must be of wedge shape, with the angle placed backward, or to the left, and falling downward.

The platform K, the attachment L, the frame O, the lever D, and the rake-head F may be of wood, the balance of iron, except the spring H, which is steel.

The upper edge of the attachment L and of the slot P should be faced with iron.

The operation of the machine is as follows: Suppose the rake to be at the outer or left-hand edge of the platform K, the dog or pin C will be at the right-hand angle of the wheel. ("Right" and "left" are used in this specification as referring to the reaper in motion.) The reaper being driven, the dog or pin C will be forced toward the left in the slot B, and this will turn the lever D upon its pivot, bringing the backward end to the right, and drawing the rake, with the grain, rapidly over the platform, and delivering it. At this time the dog or pin C will have reached the other angle of the slot B, and the pin I will have kept the rake down by impinging or resting all the time upon the attachment L. The pin or dog C will then turn in its direction around such angle, and be forced from left to right, and the spring H will force the pin I down into the slot P, and the rake will be lifted up. As the motion continues the rake will pass slowly back, being kept in an elevated position by the forward surface of the attachment L until the rake reaches the outer or left-hand edge of the platform K, where it will be allowed to fall, the attachment L being slightly shorter at that end than the platform. The pin or dog C will then be at the first angle of the slot B, or the point of starting, and the same motions will be continued as long as the reaper is driven.

The improvement claimed by the inventors for their reaper-rake upon other machines in use is in its greater simplicity of construction and action, doing away with the cogs and belts usually employed; also, in its rapidity of action in raking the grain, and the perfect control given in this respect by altering or adjusting the angles of the slot B, which will cause the raking off to be accomplished as quickly as desired, while the balance of the revolution of the wheel A is occupied in returning the rake.

What we claim as our invention, and desire to secure by Letters Patent, is—

1. The rake F, mounted on the rod G, in combination with the guide-board L, having the groove P formed therein, and the spring H, all constructed and arranged to operate substantially as described.

2. The combination of the wheel A, having the groove B formed therein, as described, with the lever D, pivoted to the standard M, having the arm T attached, for operating the rake, substantially as set forth.

JAMES B. BOWEN.
CLEANTHUS A. REED.
CHARLES A. WHELAN.

Witnesses:
CHAS. T. WAKELY,
J. H. McFARLAND.